US008353163B2

(12) United States Patent
Smith

(10) Patent No.: US 8,353,163 B2
(45) Date of Patent: Jan. 15, 2013

(54) FUEL INJECTOR SANS SUPPORT/STEM

(75) Inventor: David S. Smith, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 13/302,468

(22) Filed: Nov. 22, 2011

(65) Prior Publication Data

US 2012/0061494 A1 Mar. 15, 2012

Related U.S. Application Data

(63) Continuation of application No. 12/194,597, filed on Aug. 20, 2008, now Pat. No. 8,091,362.

(51) Int. Cl.

| | |
|---|---|
| ***F02C 1/00*** | (2006.01) |
| ***F02C 7/20*** | (2006.01) |
| ***F02G 3/00*** | (2006.01) |
| ***B05B 1/24*** | (2006.01) |
| ***B05B 15/00*** | (2006.01) |

(52) U.S. Cl. ......... 60/740; 60/800; 239/132; 239/397.5; 239/591

(58) Field of Classification Search ................. 239/14.2, 239/132, 132.3, 139, 397.5, 591; 60/740, 60/742, 746, 747, 776, 800, 804; 123/445, 123/456

See application file for complete search history.

(56) References Cited

U.S. PATENT DOCUMENTS

| | | | | |
|---|---|---|---|---|
| 4,735,044 A | | 4/1988 | Richey et al. | |
| 5,269,468 A | | 12/1993 | Adiutori | |
| 5,361,578 A | | 11/1994 | Donlan | |
| 5,423,178 A | * | 6/1995 | Mains | 60/776 |
| 6,076,356 A | * | 6/2000 | Pelletier | 60/740 |
| 6,149,075 A | | 11/2000 | Moertle et al. | |
| 6,357,222 B1 | | 3/2002 | Schilling et al. | |
| 6,761,035 B1 | * | 7/2004 | Mueller | 60/800 |
| 6,877,306 B2 | | 4/2005 | Wernberg et al. | |
| 6,915,638 B2 | * | 7/2005 | Runkle et al. | 60/740 |
| 2007/0251503 A1 | | 11/2007 | Buehner | |
| 2007/0283931 A1 | | 12/2007 | Mao | |
| 2009/0126687 A1 | | 5/2009 | Paterson | |
| 2010/0051728 A1 | | 3/2010 | Hicks | |
| 2010/0071666 A1 | | 3/2010 | Lee et al. | |
| 2010/0071667 A1 | | 3/2010 | Hicks et al. | |
| 2011/0073071 A1 | | 3/2011 | Smith | |

FOREIGN PATENT DOCUMENTS

| | | |
|---|---|---|
| DE | 41 27 455 A1 | 2/1993 |
| EP | 1 793 169 A2 | 6/2007 |
| JP | 8049513 A | 2/1996 |
| JP | 2006-138566 A | 6/2006 |

* cited by examiner

*Primary Examiner* — Ryan Reis

(74) *Attorney, Agent, or Firm* — Reinhart Boerner Van Deuren P.C.

(57) ABSTRACT

A fuel nozzle is provided. The fuel nozzle includes a heat shield, a fuel tube and a plurality of support members. The support members are radially interposed between the heat shield and the fuel tube. The support members are preferably cylindrical tubes, thus creating voids or pockets between the heat shield and the fuel tube. The cylindrical tubes are connected to one another at a first end are free at an opposed end. As such, the tubes can move or slide relative to one another. Further, the tubes preferably only contact one another with at most line contacts. The fuel nozzle may also include a tip portion that includes a tip heat shield that extends radially outward from the primary heat shield. The tip heat shield defines a cavity that connects with the central cavity of the heat shield. The fuel tube extends through the tip heat shield.

20 Claims, 4 Drawing Sheets

FUEL INJECTOR SANS SUPPORT/STEM

CROSS-REFERENCE TO RELATED PATENT APPLICATION

This patent application is a Continuation of co-pending U.S. patent application Ser. No. 12/194,597, filed Aug. 20, 2008, the teachings and disclosure of which are incorporated herein in their entireties by reference thereto.

FIELD OF THE INVENTION

This invention generally relates to fuel delivery systems and more particularly to fuel injectors (i.e. fuel nozzles) for delivering fuel to combustion chambers for combustion engines.

BACKGROUND OF THE INVENTION

Fuel injectors (a.k.a. fuel nozzles) are important components of gas turbines as well as other gas combustion engines. Because the fuel nozzle is the source of the fuel, the fuel nozzle can provide significant play in the role of engine performance.

Because the fuel nozzle extends into the combustion chamber (a.k.a. the combustor), typically, a fuel nozzle includes an external support/stem through which an internal fuel tube extends. The fuel tube will be connected to an atomizer or other tip to improve the delivery state of the fuel so that it will properly mix with air in the combustion chamber.

During operation, and particularly within a turbine engine, the support/stem is surrounded by high-temperature and high-pressure air exiting the compressor. However, it is desirable to deliver the fuel at a much lower temperature than the compressor air. More particularly, if too much heat is transferred to the fuel, the fuel can begin to coke, thereby ruining or reducing the quality of the fuel. Additionally, coke deposits can form on or in the fuel injector decreasing and in some instances entirely stopping flow through the fuel injector. Thus, there have been many attempts to reduce the amount of heat that can be transferred from the high-temperature compressor air to fuel passing through the fuel injector.

Unfortunately, the support/stem is typically a solid cast, wrought, forged, machined or similarly formed piece free of thermal barriers that can allow for significant heat transfer. Further, as the support/stem is exposed to the high-temperature compressor air, the support/stem experiences significant thermal stresses due to thermal expansion and contraction. The thermal stresses can be amplified by the temperature gradient between the high-temperature compressor air within the compressor discharger and the "colder" fuel passing through the fuel injector. As the support/stem is a solid piece, the material of the support/stem is exposed to internal interrelational stresses that can fatigue the support/stem, thereby weakening the structural strength of the fuel nozzle.

Further, a typical support/stem can have a low stiffness-to-mass ratio which promotes lower modal frequencies because of the solid configuration. Additionally, the fuel nozzle is typically mounted within a combustion chamber in a cantilevered configuration with a large atomizer tip at the end of the cantilever. This arrangement is much like a pendulum. This large mass at the end of the support/stem further promotes lower modal frequencies.

Finally, because the support/stem is typically a solid cast, wrought, forged, machined or similarly manufactured component, the manufacturing costs associated therewith can be significant. Particularly, if minor modifications to the fuel nozzle, and particularly the support/stem, are desired, new tooling and dies are often required which is costly, if not prohibitive.

The present invention relates to improvements over the current state of the art in fuel nozzles.

BRIEF SUMMARY OF THE INVENTION

In view of the above, embodiments of the present invention provide a new and improved fuel nozzle for a turbine engine or other combustion engine. More particularly, embodiments of the invention provide a new and improved fuel nozzle that can be formed from standard materials that do not need to be molded, formed or otherwise exposed to expensive manufacturing processes and that can eliminate the need for the standard support/stem. Additionally, embodiments of the invention provide a new and improved fuel nozzle that can increase a stiffness-to-mass ratio of the fuel nozzle to thereby increase modal frequencies. Further, embodiments of the invention provide a new and improved fuel nozzle that reduces some of the interrelational or internal stresses due to operational conditions of the fuel nozzle. Finally, other embodiments of the invention provide a new and improved fuel nozzle that provides an improved interface between a primary heat shield and a heat shield for a tip portion of the fuel nozzle.

In one embodiment, the invention provides a fuel nozzle that includes a heat shield, a fuel tube, and a plurality of support members. The heat shield surrounds a central cavity through which the fuel tube extends. The plurality of support members are also positioned within, at least in part, the central cavity and support the fuel tube. The plurality are radially interposed between the heat shield and the fuel tube to maintain the radial position of the fuel tube within the heat shield. Thus, the support members provide support for the fuel tube. In other embodiments, the fuel tube may be an arrangement of fuel delivery tubes and that can be concentric, staggered axially, etc. As used herein, "fuel tube" shall be considered to generally refer to a single fuel tube or a plurality of fuel tubes.

In a preferred implementation, the heat shield and support members are cylindrical tubes. In an even more preferred implementation, the cylindrical tubes for the heat shield and support members are formed from nominal sizes so that they can be "off-the-shelf" components.

In another implementation, the support members are a plurality of different sets of cylindrical tubes. Each tube of each set of tubes being radially offset from a central axis, defined by the fuel tube, a constant distance. Further, each tube of each set of tubes having a same radius such that they are substantially identical tubes angularly spaced about the central axis.

In yet another implementation, the support members are affixed to one another at a first end such that those ends of the plurality of support members cannot move relative to one another. However, the opposed ends of the plurality of support members are free, such that the individual tubes are free to slide relative to one another in the event that the support members are bent due to operational conditions. Additionally, the support members are free to expand and contract independently reducing the interrelational stresses and internal stresses within the support structure of the fuel tube, i.e. the plurality of support members.

In one embodiment with the support members coupled at a first end only, the fuel nozzle includes a cap that connects the ends and covers the ends of the support members. In a further preferred implementation, the fuel nozzle further includes a head portion coupled to the heat shield that is typically external to the combustion chamber in operation. In this embodiment, the cap and connected ends of the support members are preferably positioned within the head portion to further insulate the connected ends of the support members from the heat that is exposed to the fuel nozzle.

In a further embodiment of the present invention, a fuel nozzle is provided that includes an improved method of connecting a tip portion of the nozzle to the heat shield. The fuel nozzle includes a heat shield, a tip shield and a fuel tube. The heat shield surrounds a central cavity and extends along a central axis. The tip shield surrounds a tip cavity. The tip shield extends radially outward from the heat shield along a tip axis being transverse to the central axis. The tip shield cavity is operably connected to the central cavity to define a single passage. The fuel tube has a first portion within the central cavity extending along the central axis and a second portion within the tip cavity and extending along the tip axis.

In a preferred implementation of this embodiment, the tip shield extends radially through an aperture formed in the heat shield. The aperture of the heat shield includes or is surrounded by a radially inward extending flange portion. The portion of the tip shield extending through the aperture is secured to the radially inward extending flange portion. More preferably, the portion of the tip shield extending through the aperture is threadedly secured to the radially inward extending flange portion and the tip shield is welded to the heat shield. Further yet, the inward extending flange is preferably formed by material that previously formed a part of the sidewall of the heat shield that is flowed radially inward. This flowing of the material radially inward is preferably executed by using a high speed spinning mandrel that forces the material radially inward. Subsequent to flowing the material radially inward, the flange is preferably tapped such that it can mate with threads formed on an outer surface of the tip shield.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
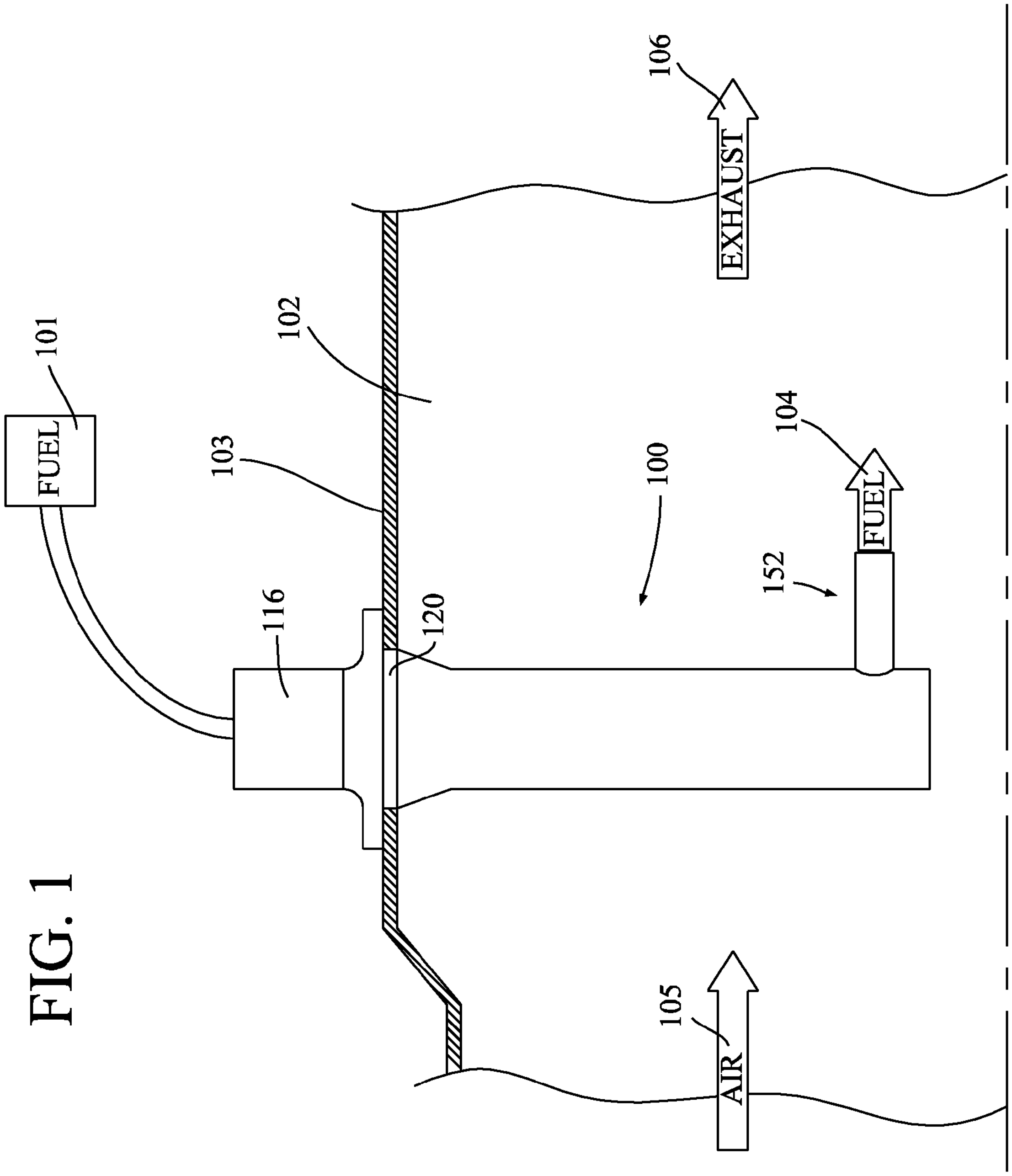
FIG. 1 is a simplified schematic illustration of a combustion chamber including a fuel nozzle in accordance with the teachings of the present invention.

Turning now to FIG. 1, a fuel nozzle 100 is illustrated in a suitable environment for delivery of fuel that is supplied from a fuel supply 101 to a combustor or combustion chamber 102. Preferably, the combustion chamber 102, illustrated in simplified form, is the combustion chamber of a turbine engine and is bounded by boundary wall 103, also referred to as an engine case. However, the fuel nozzle 100 could be implemented in other systems requiring combustion of a fuel such as a piston driven internal combustion engine.

Fuel illustrated as arrow 104 supplied from the nozzle 100 is combusted in the combustion chamber 102 with air, illustrated as arrow 105. As is well known in the art, the combusted exhaust gasses, illustrated as arrow 106, when in a turbine environment, flow out of the combustion chamber and drive a set of turbine blades (not shown). Alternatively, in a piston engine, the expanding exhaust gasses drive the pistons. During this process, because the fuel nozzle 100 extends into the combustion chamber, the fuel nozzle 100 is exposed to extreme temperatures and forces due to the combustion of the fuel. Additionally, the fuel nozzle 100 is exposed to significant amounts of vibrations translated from the engine to the fuel nozzle 100.

Figure 2:
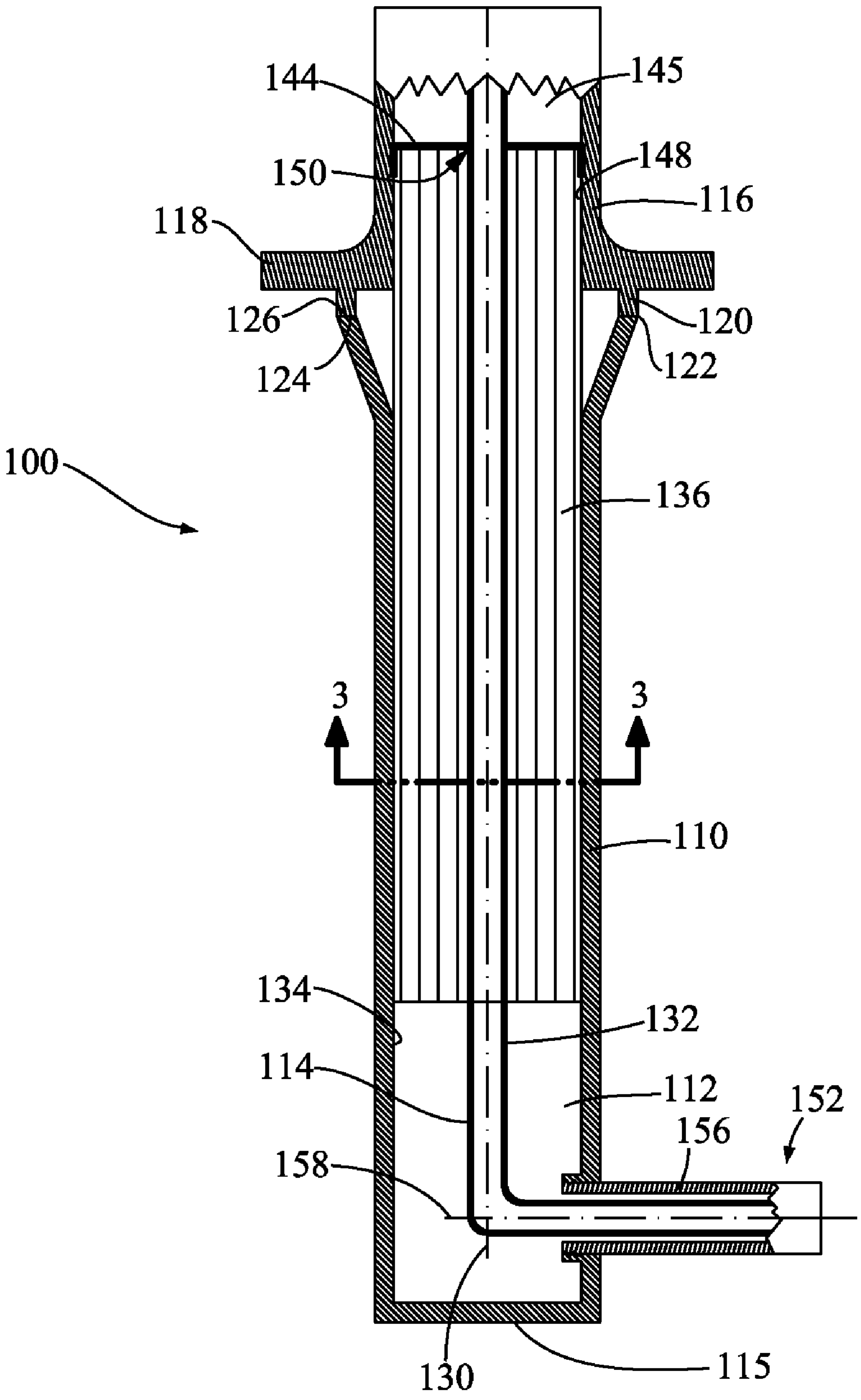
FIG. 2 is a simplified cross-sectional illustration of the fuel nozzle of FIG. 1 taken about a longitudinal axis of the fuel nozzle.

Referring now to FIG. 2, a representative embodiment of the fuel nozzle 100 in accordance with the teachings of the present invention is illustrated in cross-section and in simplified form.

The fuel nozzle 100 includes a heat shield 110 that forms a central cavity 112 through which a fuel tube 114 passes. The fuel tube 114 carries the fuel that is to eventually be delivered to the combustion chamber 102. While illustrated as a single tube, the fuel tube 114 could be formed by a plurality of tubes to provide various flows of fuel. The heat shield 110 in a preferred embodiment is formed from a cylindrical tube of metal material. The heat shield 110 can be constructed of deep drawn sheet metal or be formed as separate stamped components and then welded together. Alternatively, the heat shield could be formed from nominal sized tubing with the free end 115 (i.e. the end opposite the end connected to mounting head portion 116 that is cantilevered into combustion chamber 102) being capped.

The fuel nozzle 100 further includes a mounting head portion 116 that is used to mount the fuel nozzle 100 to the combustion chamber 102. The mounting head portion 116 includes a radially outward extending flange 118 that mounts the fuel nozzle 100 to the engine case 103. However, alternative methods of securing the fuel nozzle 100 to the combustion chamber 102 can be used.

The mounting head portion 116 may optionally include an axially extending boss 120 that would extend into an aperture of the engine case 103 to locate the fuel nozzle 100 relative thereto.

The heat shield 110 is operably coupled to mounting head portion 116 and preferably connected to mounting head portion 116. The heat shield 110 as illustrated connects to head portion 116. In the illustrated embodiment, the heat shield 110 is axially connected to the boss 120 at a welded joint 122 that is preferably a butt joint formed between distal ends 124, 126 of the boss 120 and heat shield 110, respectively. However, other joints could be used to secure the heat shield 110 to the head portion 116. For example, a lap joint could be used such that the distal end 124 of the boss 120 extends axially into the cavity 112 of the heat shield 110 or the distal end 126 of the heat shield 110 extends axially into the boss 120. Further yet, the boss 120 could be entirely removed and the heat shield 110 could be directly connected to flange 118, such as by way of a tee weld. Other means of connecting the heat shield 110 to mounting head portion 116 could be employed as well.

The heat shield 110 of the illustrated embodiment is substantially tubular about longitudinal central axis 130 and a first portion of the fuel tube 114 extends axially along the central axis 130 of the heat shield 110.

Unlike prior fuel nozzles, fuel nozzle 100 is free of a cast, wrought, forged, machined or otherwise expensively manufactured support/stem that circumferentially surrounds the fuel tube 114. Instead, the illustrated embodiment of the fuel nozzle 100 includes a support structure formed by a plurality of support members, illustrated in the form of a plurality of independent cylindrical tubes 136 that support and assist in thermally isolating the fuel tube 114 from the heat shield 110. The tubes will be referred to generally with reference numeral 136 and more specifically with reference numeral 136 having an alphabetic subscript. The tubes 136 also maintain the radial position of the fuel tube 114 relative to heat shield 110.

Figure 3:
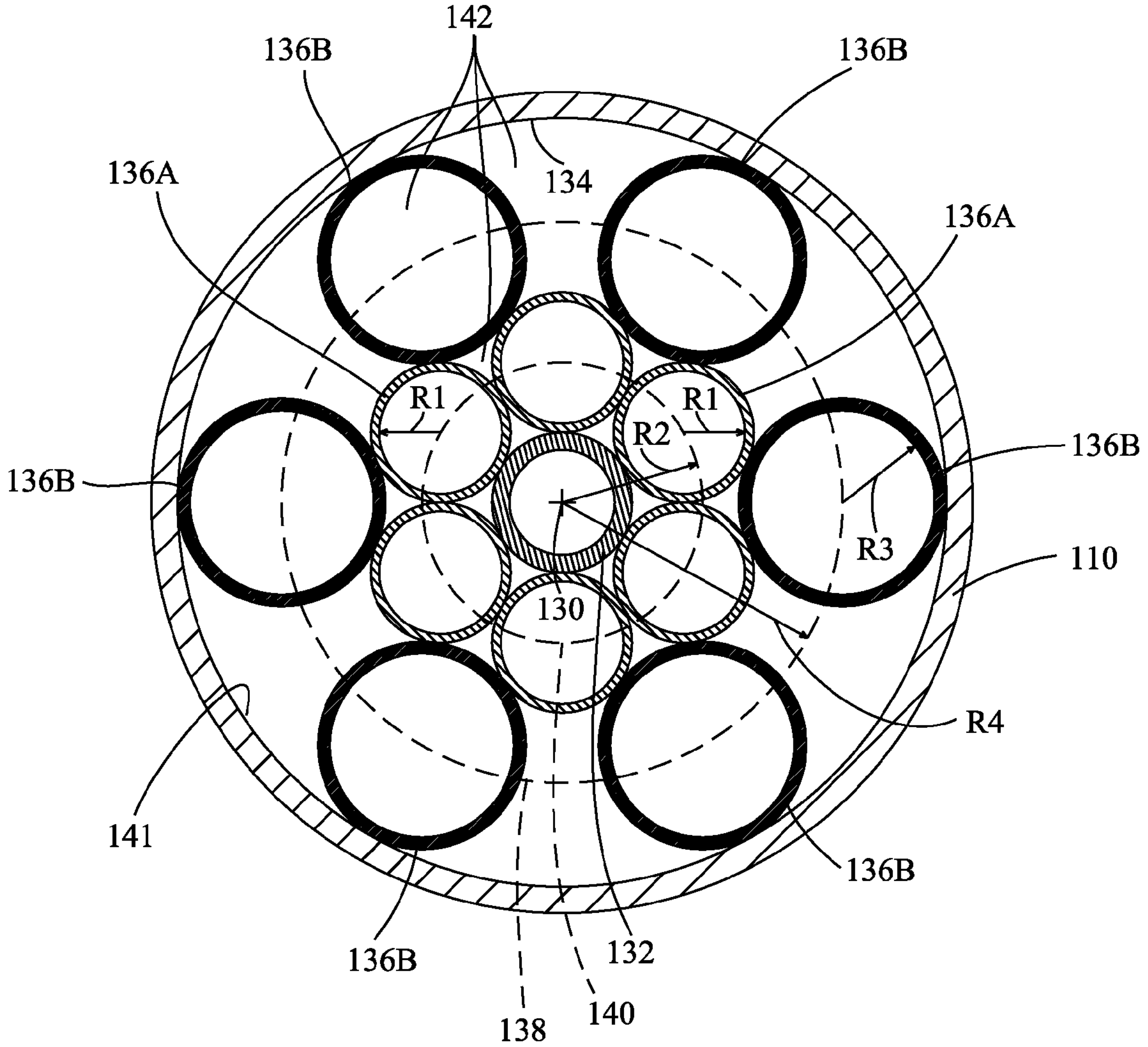
FIG. 3 is a simplified cross-sectional illustration of the fuel nozzle of FIG. 1 taken perpendicular to a longitudinal axis of the fuel nozzle.

With further reference to FIG. 3, the tubes 136 are interposed radially between the outer surface 132 of the fuel tube 114 and the inner surface 134 of the heat shield 110. In the illustrated arrangement, the tubes 136 include a first set of tubes $\mathbf{136}_A$ that have a common radii R1. Tubes $\mathbf{136}_A$ are all spaced radially outward from central axis 130 a same radial distance R2. As such, a central axis of each tube $\mathbf{136}_A$ is located on an imaginary circle 138 that is concentric about central axis 130 (illustrated as a cross-hair in FIG. 3). Each tube of the first set of tubes $\mathbf{136}_A$ radially contacts the fuel tube 114 and radially contacts at least two other first tubes $\mathbf{136}_A$. By radially contacting, the adjacent tubes 114, $\mathbf{136}_A$ contact one another merely at surface tangents thereby forming only line contacts therebetween. In other words, because the tubes 136 are cylindrical, the tubes 114, 136 are only allowed to interact/contact through surface tangent, creating line contacts therebetween. This arrangement creates increased thermal barriers reducing the ability of heat to transfer therebetween.

The tubes 136 also include a second set of tubes $\mathbf{136}_B$ that have radii R3. Tubes $\mathbf{136}_B$ are all spaced radially outward from central axis 130 a same radial distance R4 that is greater than radial distance R2. As such, a central axis of each tube $\mathbf{136}_B$ is located on an imaginary circle 140 that is concentric about central axis 130 and to imaginary circle 138. Each tube $\mathbf{136}_B$ will typically contact two of the first set of tubes $\mathbf{136}_A$ and an inner surface 141 of the heat shield 110. However, if more sets of tubes are provided, then the second set of tubes may merely be interposed between the first set and the third set of tubes. No predefined number of sets of tubes is necessary in practicing the present invention.

Preferably tubes 136 define an axis that is parallel to but radially offset from central axis 130. The axes defined by the tubes 136 of each set of tubes $\mathbf{136}_A$, $\mathbf{136}_B$ are preferably equally angularly spaced about central axis 130.

By interposing a plurality of tubes 136 between the heat shield 110 and the fuel tube 114, a plurality of voids 142 (also referred to as tertiary volumes) are formed between adjacent tubes 136; the tubes 136 and the fuel tube 114; and the tubes 136 and the heat shield 110. The tubes 136 themselves also form voids 142. The voids 142 provide a thermal barrier inhibiting heat transfer from the heat shield 110 to the fuel tube 114. The thermal barriers created by using a plurality of contacting tubes 136 as opposed to a single continuous support/stem help reduce heat transfer to the fuel passing through the fuel tube 114. Additionally, as the voids 142 are preferably filled with air or are in a state of vacuum, only limited heat transfer will occur through the voids 142.

Further, by utilizing cylindrical tubes in preferred embodiments, the contact between adjacent ones of the tubes 136, the fuel tube 114 and the heat shield 110 is merely by way of a line contact (i.e. tangency), further reducing heat transfer between the adjacent components. By using tubes, rather than a cast, wrought, forged, machined or otherwise manufactured support/stem, stock tubing can be used and the size of the nozzle 100 can be adjusted without requiring new tooling or dies.

As further illustrated in FIG. 2, the fuel nozzle 100 further includes a connector or cap in the form of a tube cap 144 that caps/covers a first end thereof and connects the plurality of tubes 136 at that end. In the illustrated embodiment, the tube cap 144 prevents axial displacement of the first ends of the tubes 136 relative to one another.

Additionally, it is desirable, but not necessary, to position the tube cap 144 axially above flange 118 and within a head cavity 145 defined by the mounting head portion 116. By positioning the tube cap 144 above flange 118, the tube cap 144 is positioned external to the combustion chamber 102 during operation. This orientation provides increased thermal insulation between the combustion chamber and the tube cap 144. As illustrated, the tube cap 144 is connected to the inner surface 148 of mounting head portion 116 to prevent axial movement therebetween. The inner surface 148 may include a groove in which the tube cap 144 is radially received to axially align and secure the tube cap 144 to the head portion 116. Alternatively, the tube cap 144 could be bonded, welded, brazed, friction fit, or otherwise secured within the mounting head portion 116.

The tube cap 144 also includes a central aperture 150 that is concentric with central axes 130 through which the fuel tube 114 extends.

While the tubes 136 are connected together at one end by the tube cap 144 such that they cannot move relative to one another at that end, in one embodiment, the other, opposed, ends of the tubes 136 are free such that the tubes 136 are free to displace or slip relative to one another. For example, by having the free ends, the tubes 136 are allowed to slip relative to one another, as well as the fuel tube 114 and heat shield 110, such that each tube 136 may bend independently of the other tubes if the structure bends or flexes due to thermal or dynamic forces. By allowing the tubes 136 to move relative to one another, the interrelation stresses between the tubes 136 are reduced. Thus, if one tube 136 is displaced, its movement has a reduced effect on the other surrounding tubes 136.

Preferably, the tubes 136, and even the heat shield 110, are formed from nominally sized tubes such that the fuel nozzle 100 can be cheaply and simply manufactured. Further, as the fuel nozzle 100 is constructed from a plurality of tubes, the diameter of the nozzle can easily be adjusted by merely adjusting the diameter of the heat shield 110 and adjusting the number and/or size of the tubes positioned between the heat shield 110 and the fuel tube 114 or fuel tubes in other embodiments.

As the stem/support has been removed, the heat shield 110 acts to provide additional structural support and rigidity to the fuel nozzle 100 to oppose bending. Further, by using tubes 136, stiffness can be substantially maintained while reducing mass. Thus, the stiffness-to-mass ratio is increased, thereby forcing higher modal frequencies. Further, because the heat shield 110 diameter acts as the primary dimension for increasing stiffness, as the heat shield diameter increases, the modal frequency increases.

The fuel nozzle 100 further includes a tip section 152 that extends radially outward from the main heat shield 110. This tip section 152 redirects the fuel flow through fuel tube 114 such that the fuel flow out of the nozzle 100 is substantially aligned with the air flow 103 through the combustion chamber 102.

Figure 4:
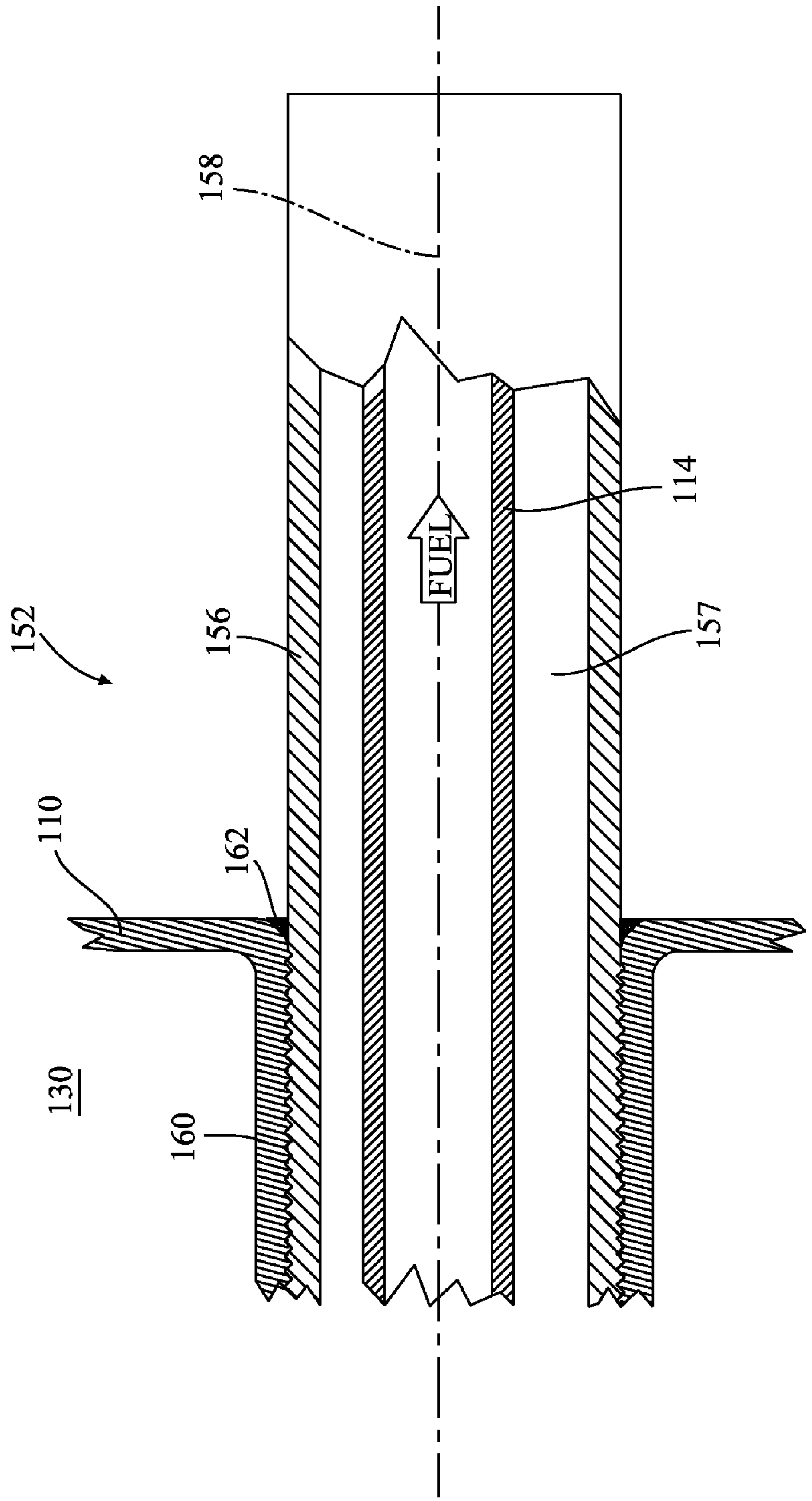
FIG. 4 is an enlarged partial cross-sectional illustration of the tip portion of the fuel nozzle.

With additional reference to FIG. 4, the tip section 152 is formed by a tip heat shield 156 coupled to heat shield 110. The tip heat shield 156 defines a tip cavity 157 through which a portion of the fuel tube 114 extends. The gaps formed between the fuel tube 114 and tip heat shield 110 provide additional thermal insulation or barriers reducing the heat transfer to the fuel flowing through fuel tube 114.

The fuel tube 114 is bent or includes a corner such that it aligns with the tip heat shield 156 along a dispensing axis 158 that is generally perpendicular to central axis 130. However, in other embodiments, the dispensing axis 158 may extend at other transverse degrees relative to central axis 130. While not shown, the tip section 152 can be configured to receive or mount an atomizer that further assists mixing of the fuel exiting the fuel nozzle 100 with air flow 104 to promote increased combustion and power output.

The tip heat shield 156 extends through an aperture formed through the side of the heat shield 110. In a preferred embodiment, the portion of the material that is removed to form the aperture is deformed radially inward into central cavity 130 forming a radially inward extending flange 160. Flange 160 preferably includes internal threads that mate with external threads formed on an outer surface of the tip heat shield 156. The interaction of the threads secures the tip heat shield 156 to heat shield 110.

The aperture and flange 160 are preferably formed by flowing the material radially inward using a spinning operation with a high speed mandrel. The aperture and flange 160 are then internally threaded to mate with the threads of the tip heat shield 156.

An optional weld 162, braze or adhesive connection, can be used to further secure the tip heat shield 156 to heat shield 110 and prevent the tip heat shield 156 from unthreading or backing off from heat shield 110.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel nozzle comprising:

a heat shield surrounding a central cavity;

a fuel tube extending through the central cavity;

a plurality of support members within the central cavity, the plurality of support members being radially interposed between the heat shield and the fuel tube and maintaining the radial position of the fuel tube within the heat shield; and wherein first longitudinal ends of the support members are connected to one another and wherein opposed second longitudinal ends of the support members are disconnected from one another such that the second longitudinal ends are free to move relative to one another.

2. The fuel nozzle of claim 1, further including a support member connector that connects the first ends of the plurality of support members to one another.

3. The fuel nozzle of claim 2, wherein the support member connector is a cap that axially covers the first ends of the support members, the cap includes a central aperture through which the fuel tube axially extends.

4. The fuel nozzle of claim 3, further including a mounting head portion defining a head cavity, the heat shield operably coupled to the mounting head portion such that the central cavity connects with the head cavity, the cap and first ends positioned within the head cavity and the second ends positioned within the central cavity of the heat shield.

5. The fuel nozzle of claim 4, wherein the head portion further includes a radially extending mounting flange that extends radially outward beyond an outer surface of the heat shield, the mounting flange being axially positioned between the first and second ends of the support members.

6. The fuel nozzle of claim 5, wherein the head portion further includes an axially extending boss, the heat shield being axially connected to an axial distal end of the boss forming a butt joint therebetween.

7. The fuel nozzle of claim 1, wherein the first ends of the support members are offset from the opposed second ends of the support members along the fuel tube.

8. A fuel nozzle comprising:

a heat shield surrounding a central cavity;

a fuel tube extending through the central cavity;

a plurality of support members within the central cavity, the plurality of support members being radially interposed between the heat shield and the tube and maintaining the radial position of the fuel tube within the heat shield; and wherein first ends of the support members are connected to one another and wherein opposed second ends of the support members are free to move relative to one another; and wherein the first ends of the support members are connected to one another such that the first ends of the plurality of support members cannot move relative to one another.

9. The fuel nozzle of claim 1, wherein the opposed second ends of the support members are free to move relative to one another such that each individual support member is free to slide relative to one another when the support members are bent due to operational conditions.

10. The fuel nozzle of claim 1, wherein the opposed second ends of the support members are free to move relative to one another such that the support members are free to expand and contract independently of one another thereby reducing the interrelational stresses and internal stresses within the plurality of support members.

11. The fuel nozzle of claim 1, wherein the plurality of support members comprises a plurality of individual cylindrical tubes.

12. A fuel nozzle comprising:

a heat shield surrounding a central cavity;

a fuel tube extending through the central cavity;

a plurality of support members within the central cavity, the plurality of support members being radially interposed between the heat shield and the fuel tube and maintaining the radial position of the fuel tube within the heat shield; and wherein first ends of the support members are connected to one another and wherein opposed second ends of the support members are free to move relative to one another;

wherein the plurality of support members comprises a plurality of individual cylindrical tubes; and wherein the plurality of individual cylindrical tubes comprise a plurality of different sets of cylindrical tubes.

13. The fuel nozzle of claim 12, wherein each tube of each set of tubes is radially offset from a central axis, defined by the fuel tube, a constant distance.

14. The fuel nozzle of claim 12, wherein each tube of each set of tubes has a same radius such that they are substantially identical tubes angularly spaced about the central axis.

15. A fuel nozzle comprising:

a heat shield surrounding a central cavity;

a fuel tube extending through the central cavity;

a plurality of support members within the central cavity, the plurality of support members being radially interposed between the heat shield and the fuel tube and maintaining the radial position of the fuel tube within the heat shield; and wherein the heat shield extends along a central axis, and wherein a longitudinal axis running along the length of each of the plurality of support members is parallel to but radially offset from the central axis of the heat shield, the fuel nozzle further including a tip shield attached to a side of the heat shield at a point of attachment, the tip shield extending radially outward from the heat shield along a tip axis being transverse to the central axis at the point of attachment, a first portion of the fuel tube extending along the central axis and a second portion of the fuel tube extending along the tip axis.

16. The fuel nozzle of claim 15, wherein the tip shield extends radially through an aperture formed in the heat shield, the aperture of the heat shield including a radially inward extending flange portion, the portion of the tip shield extending through the aperture being secured to the radially inward extending flange portion.

17. The fuel nozzle of claim 16, wherein the portion of the tip shield extending through the aperture is threadedly secured to the radially inward extending flange portion and the radially inward extending flange portion is formed from a portion of the side wall of the heat shield that is moved to form the aperture.

18. A fuel nozzle comprising:

a heat shield surrounding a central cavity and extending along a central axis, a tip shield surrounding a tip cavity, the tip shield extending radially outward from a side of the heat shield along a tip axis being transverse to the central axis, the tip shield cavity connected to the central cavity to define a single passage;

a fuel tube having a first portion within the central cavity extending along the central axis and a second portion within the tip cavity and extending along the tip axis; and a plurality of individual cylindrical tubes longitudinally parallel to the central axis within the central cavity, the plurality of individual cylindrical tubes being radially interposed between the heat shield and the fuel tube and maintaining the radial position of the fuel tube within the heat shield.

19. The fuel nozzle of claim 18, wherein the tip shield extends radially through an aperture formed in the heat shield, the aperture of the heat shield including a radially inward extending flange portion, the portion of the tip shield extending through the aperture being secured to the radially inward extending flange portion.

20. The fuel nozzle of claim 19, wherein the portion of the tip shield extending through the aperture is threadedly secured to the radially inward extending flange portion and the tip shield is welded to the heat shield.

* * * * *

UNITED STATES PATENT AND TRADEMARK OFFICE

CERTIFICATE OF CORRECTION

PATENT NO. : 8,353,163 B2
APPLICATION NO. : 13/302468
DATED : January 15, 2013
INVENTOR(S) : Smith It is certified that error appears in the above-identified patent and that said Letters Patent is hereby corrected as shown below:

Claim 8
Column 8, Line 52, after "the heat shield and the" and before "tube end main-"
add the word --fuel--

Signed and Sealed this
Twenty-sixth Day of February, 2013

Teresa Stanek Rea
*Acting Director of the United States Patent and Trademark Office*